US006287653B1

(12) United States Patent
Speer et al.

(10) Patent No.: US 6,287,653 B1
(45) Date of Patent: *Sep. 11, 2001

(54) BY-PRODUCT ABSORBERS FOR OXYGEN SCAVENGING SYSTEMS

(75) Inventors: Drew Ve Speer, Columbia; Charles Robert Morgan, Brookeville; Thomas Andrew Blinka, Columbia; Ronald Lee Cotterman, Laurel, all of MD (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/263,905

(22) Filed: Mar. 5, 1999

Related U.S. Application Data

(63) Continuation of application No. 08/612,357, filed on Mar. 7, 1996, now Pat. No. 5,942,297.

(51) Int. Cl.$^7$ .......................... B29D 22/00; B65B 53/00
(52) U.S. Cl. .................... 428/35.4; 428/36.7; 428/36.6; 428/518; 426/398; 252/188.28
(58) Field of Search ................. 428/35.4, 36.7, 428/36.6, 518, 35.7; 426/398, 271; 252/188.28

(56) References Cited

U.S. PATENT DOCUMENTS

| 4,908,151 | 3/1990 | Inoue et al. ............ 252/188.28 |
| 5,143,763 | 9/1992 | Yamada et al. ............ 428/36.2 |
| 5,153,038 | 10/1992 | Koyama et al. ............ 428/35.8 |
| 5,246,753 | 9/1993 | Koyama et al. ............ 428/36.7 |
| 5,284,892 | 2/1994 | Brodie, III et al. ............ 524/251 |
| 5,310,497 | 5/1994 | Ve Speer et al. ............ 252/188.28 |
| 5,340,884 | 8/1994 | Mills et al. ............ 125/420 |
| 5,391,426 | 2/1995 | Wu ............ 428/246 |

FOREIGN PATENT DOCUMENTS

| 0 504 726 A1 | 3/1992 | (EP) . |
| 0 638 487 A | 2/1995 | (EP) . |
| 62186941 | 8/1987 | (JP) . |

OTHER PUBLICATIONS

Hei 5–247276 Abstract; Japan; Sep. 24, 1993; Nakamura et al.; "Oxygen Barrier Resin Composition".

*Primary Examiner*—Joseph D. Anthony
(74) *Attorney, Agent, or Firm*—Mark B. Quatt

(57) ABSTRACT

A package for oxygen sensitive goods is made using a barrier material, an oxygen scavenging system, and a polymeric base which is reactive with the by-products of oxygen scavenging. Such packages demonstrate improved product quality.

4 Claims, No Drawings

BY-PRODUCT ABSORBERS FOR OXYGEN SCAVENGING SYSTEMS

This is a continuation of application Ser. No. 08/612,357, filed on Mar. 7, 1996, now U.S. Pat. No. 5,942,297.

FIELD OF THE INVENTION

The invention generally relates to compositions, articles and methods for scavenging oxygen in environments containing oxygen-sensitive products, particularly food and beverage products. As will be evident from the disclosure below, the term "oxygen scavenger" refers to compositions, articles or the like which consume, deplete or reduce the amount of oxygen from a given environment. By-product absorbing layers made from polymeric bases can be incorporated into multilayer packaging films to reduce the migration of the by-products of oxygen absorption, and thereby improve the quality of the product.

BACKGROUND OF THE INVENTION

It is well known that regulating the exposure of oxygen-sensitive products to oxygen maintains and enhances the quality and "shelf-life" of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and having to restock inventory. In the food packaging industry, one means for regulating oxygen exposure that has been developed uses polymeric films made from the oxygen scavengers disclosed in U.S. Pat. No. 5,346,644 issued to Speer et al Sept. 13, 1994, and in copending U.S. Ser. No. 276,125 filed Jul. 15, 1994 for "Compositions, Articles and Methods for Scavenging Oxygen". A method of initiating oxygen scavenging generally is disclosed in U.S. Pat. No. 5,211,875 issued to Speer et al. May 18, 1993, and in U.S. Ser. No. 263,596 filed Jun. 22, 1994. The references are incorporated herein by reference as if set forth in full. These oxygen scavengers have a demonstrable effect on the quality of certain food products. Further, these materials can be used as a lidstock or incorporated in multilayer packaging materials to produce thin, flexible, transparent films that are high oxygen barriers, or are capable of scavenging oxygen from the headspace of a package. These films are an effective substitute for a 15–40 micrometer layer of aluminum foil in some applications.

It has been found that the oxygen scavenging process may produce by-products such as organic acids or aldehydes that can result in off-odors and flavors. Migration of these by-products is not necessarily prevented by the presence of layers which are fairly effective barriers to other materials such as gaseous oxygen or carbon dioxide. However, if a layer containing an additive that reacts readily with oxidation by-products is employed in a multilayer package, the occurrence of off-odors or flavors that result from the oxygen scavenging process can be either reduced or prevented.

Various means of regulating off-odors and flavors in polymeric materials are known. For example, U.S. Pat. No. 5,340,884, issued to Mills et al. Aug. 23, 1994, relates to the use of polyester blended with low molecular weight polyamides instead of pure polyester to produce a high barrier resin with a reduced amount of residual acetaldehyde.

U.S. Pat. No. 4,908,151, issued to Inoue Mar. 13, 1990, teaches that an oxygen absorbent sachet can be made using a liquid unsaturated fatty acid, a transition metal, preferably iron, and a base. The base is disclosed to solidify the liquid unsaturated fatty acid and reduce odors caused by the reaction of the fatty acid with oxygen. The disclosure is directed to maximizing the available surface area of the acid, thereby enhancing its reactivity (Col. 8, lines 43–49). There is no indication that a useful oxygen absorbent can be formed into films and need not be separately packaged in a sachet.

Aldehyde-absorbing layers made of polyalkylene imines are known for incorporation into polyethylene and polypropylene films as a method of reducing the build-up of oil degradation by-products from snack foods, see U.S. Pat. No. 5,284,892 issued to Brodie et al., Feb. 8, 1994, for "Aldehyde Scavenging Compositions and Methods Relating Thereto" and in protective clothing as a barrier layer, see U.S. Pat. No. 5,391,426 issued to Wu Feb. 21, 1995. However, there has been no indication that incorporation of these materials in a multi-layer packaging film will be effective to reduce migration of the by-products of oxygen absorption that takes place within an ethylenically unsaturated film layer.

European Patent Publication 504 276 A1 discloses that cyclic urea derivatives can be incorporated in a sachet with an oxygen absorbent and an ethanol source. The cyclic urea derivative absorbs acetaldehyde produced by the oxidation of ethanol. The oxygen absorber is preferably iron filings or a zeolite powder. Neither polymeric oxygen scavengers nor the making of films is disclosed or discussed.

Japanese Kokai Patent No. HEI 5-247276 published Sep. 24, 1993 by Toppan Printing Co. discloses odor suppression in an oxygen barrier film by blending a variety of adsorbents into a monolayer film made of an oxygen scavenging resin. The reference discloses a wide variety of resins. All the experiments are directed to the combination of "natural zeolite" with polyethylenes and polypropylenes, which are different from the preferred oxygen scavengers used in the present invention, and which are acknowledged to degrade upon oxidation (page 6, lines 7–12).

SUMMARY OF THE INVENTION

It is an object of the invention to obtain a multilayer structure which is effective as an oxygen scavenger, absorbs the by-products of the oxygen scavenging reaction, enhances product quality, and is suitable for incorporating into an article containing an oxygen-sensitive product.

It is a further object of the invention to provide a novel multilayer structure suitable for use in packaging of food and beverage products.

The above-mentioned objects are obtained from a novel multilayer structure comprising:

(a) an oxygen barrier layer or layers;

(b) an oxygen scavenging layer or layers, and (c) a by-product absorbing layer or layers.

The articles of this invention limit the oxygen exposure by acting as an active oxygen barrier or acting as means for scavenging oxygen from within the article. The addition of the by-product absorbing layer improves the effectiveness of the articles by reducing migration of the by-products of the oxygen scavenging and thereby enhances the product quality.

Such articles include flexible, transparent packaging films which are capable of high oxygen barrier or headspace oxygen scavenging and also have a reduced occurrence of off-odors and flavors.

It is a further object of this invention to provide a packaging film which maintains its oxygen barrier characteristics after exposure to elevated humidity and/or elevated temperature.

It is yet another object of this invention to provide such a film which can enhance the quality of an oxygen-sensitive product which is also sensitive to the presence of organic by-products such as aldehydes or carboxylic acids.

Further objects and advantages of the present invention will be apparent from the description that follows.

DESCRIPTION OF THE INVENTION

The invention can be used in packaging articles having several forms. Suitable articles include, but are not limited to, rigid containers, flexible bags, or combinations of both. Typical rigid or semi-rigid articles include plastic, paper, glass, cardboard or foil laminate cartons or bottles and metal or composite cans such as juice containers, soft drink containers, and thermoformed trays or cups which have wall thicknesses in the range of 100 to 2000 micrometers. Typical flexible bags include those used to package many food items, and will likely have thicknesses of 5 to 400 micrometers. In addition the walls of such articles often comprise multiple layers of material. Though it may be preferable from the standpoint of packaging convenience or scavenging effectiveness to employ the invention as an integral part of the package wall, the invention can also be used as a non-integral packaging component such as full or partial coatings, bottle or jar cap liners, adhesive or non-adhesive sheet inserts, sealants, gaskets or fibrous mat inserts.

Besides packaging articles for food and beverage, packaging for other oxygen-sensitive products can benefit from the invention. Such products include pharmaceuticals, oxygen sensitive medical products, corrodible metals or products such as electronic devices, etc.

The preferred oxygen scavengers are made of an ethylenically unsaturated hydrocarbon and transition metal catalyst. However, one of ordinary skill in the art will readily recognize that the present invention is applicable to any oxygen scavenging system that produces by-products such as acids, aldehydes, and ketones. The preferred ethylenically unsaturated hydrocarbon may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50% –99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene-butadiene. Such hydrocarbons also include polymeric compounds such as polypentenamer, polyoctenamer, and other polymers prepared by olefin metathesis; diene oligomers such as squalene; and polymers or copolymers with unsaturation derived from dicyclopentadiene, norbornadiene, 5-ethylidene-2-norbornene, 5-vinyl-2-norbornene, 4-vinylcyclohexene, or other monomers containing more than one carbon-carbon double bond (conjugated or non-conjugated).

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification. Such polymers are disclosed in WO 95/02616. The application is incorporated herein by reference as if set forth in full.

The composition used may also comprise a mixture of two or more of the substituted or unsubstituted ethylenically unsaturated hydrocarbons described above. While a weight average molecular weight of 1,000 or more is preferred, the ethylenically unsaturated hydrocarbon having a lower molecular weight is usable, provided it is blended with a film-forming polymer or blend of polymers.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is preferred.

When making transparent oxygen-scavenging layers according to this invention, 1,2-polybutadiene is especially preferred for use at room temperature. For instance, 1,2-polybutadiene can exhibit transparency, mechanical properties and processing characteristics similar to those of polyethylene. In addition, this polymer is found to retain its transparency and mechanical integrity even after most or all of its oxygen capacity has been consumed, and even when little or no diluent resin is present. Even further, 1,2-polybutadiene exhibits a relatively high oxygen capacity and, once it has begun to scavenge, it exhibits a relatively high scavenging rate as well.

When oxygen scavenging at low temperatures is desired, 1,4-polybutadiene, and copolymers of both styrene with butadiene and styrene with isoprene are especially preferred. Such compositions are disclosed in U.S. Pat. No. 5,310,497 issued to Speer et al. on May 10, 1994 and incorporated herein by reference as if set forth in full. In many cases it may be desirable to blend the aforementioned polymers with a polymer or copolymer of ethylene.

As indicated above, the ethylenically unsaturated hydrocarbon is combined with a transition metal catalyst. While not being bound by any particular theory, the inventors observe that suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, caprylate, linoleate, tallate, 2-ethylhexanoate, neodecanoate, oleate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art. The ethylenically unsaturated hydrocarbon and transition metal catalyst may be further combined with one or more polymeric diluents, such as thermoplastic polymers which are typically used to form film layers in plastic packaging articles. In the manufacture of certain packaging articles well known thermosets can also be used as the polymeric diluent.

Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. Blends of different diluents may also be used. However, as indicated above, the selection of the polymeric diluent largely depends on the article to be manufactured and the end use. Such selection factors are well known in the art.

Further additives may also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc.

The mixing of the components listed above is preferably accomplished by melt-blending at a temperature in the range of 50° C. to 300° C. However alternatives such as the use of a solvent followed by evaporation may also be employed. The blending may immediately precede the formation of the finished article or preform or precede the formation of a feedstock or masterbatch for later use in the production of finished packaging articles. When film layers or multi-layer articles are made from oxygen-scavenging compositions, (co)extrusion, solvent casting, injection molding, stretch blow molding, orientation, thermoforming, extrusion coating, coating and curing, lamination, extrusion-lamination, blow-molding, co-extrusion injection molding or combinations thereof would typically follow the blending.

As mentioned above, the oxygen scavenging composition may be used in a flexible or rigid single layer or multilayer article. The layers comprising the composition may be in several forms. They may be in the form of stock films, including "oriented" or "heat shrinkable" films, which may ultimately be processed as bags, etc. The layers may also be in the form of sheet inserts to be placed in a packaging cavity. In rigid articles such as beverage containers, thermoformed trays or cups, the layer may be within the container's walls and may furthermore be foamed. Even further, the layer may also be in the form of a liner placed with or in the container's lid or cap. The layer may even be coated or laminated onto any one of the articles mentioned above.

In multilayered articles, the oxygen scavenging layer may be included with layers such as, but not necessarily limited to, "oxygen barriers", that is, layers of material having an oxygen transmission rate equal to or less than 500 cubic centimeters per square meter ($cc/m^2$) per day per atmosphere at room temperature, i.e. about 25° C. Typical oxygen barriers are poly(ethylene vinyl alcohol) ("EVOH"), polyacrylonitrile, polyvinyl chloride, poly(vinylidene dichloride), polyethylene terephthalate, polyamides, silica, glass, and metal foil. "EVOH" as used herein is an ethylene vinyl alcohol copolymer having an ethylene content of preferably 32%. Commercially available resins include EVAL EC-F101(EVALCA), Soarnol D, DT, and ZL (Nippon Goshei), and Clarene R (Solvay). Ethylene content for the EVOH is preferably between about 20% and 40%, and more preferably between about 25% and 35%. An ethylene content of about 32% by weight is most preferred.

The copolymer is alternatively referred to as a hydrolyzed or saponified ethylene vinyl acetate copolymer. Preferably the saponification is carried out to a high degree, that is, greater than 90%.

The polyvinylchloride ("PVC") and poly(vinylidene dichloride) ("PVDC") materials include normally crystalline polymers, both homopolymers and copolymers, containing vinyl chloride and/or vinylidene dichloride. As copolymerizable materials there can be used vinyl dichloride, acrylonitrile, vinyl acetate, ethyl acrylate, ethyl methacrylate and methyl methacrylate. Terpolymers can also be employed, e.g. a terpolymer of vinylidene dichloride, dimethyl maleate and vinyl chloride. In general, the vinylidene dichloride constituent is at least 50 percent of the material in the polymer, and preferably in the range of 60 to 80 percent, and is a blend of 5–40% suspension polymer and 60–95% emulsion polymer, preferably with an epoxy resin blended therewith in an amount of 2–10%.

An alternate barrier layer can be formed from a latex emulsion coating grade of vinylidene dichloride/vinyl chloride having 5–15% vinyl chloride. In a preferred form the coating grade polymer of vinylidene dichloride/vinyl chloride is present in an amount of from 5–100% (of total solids) with the remainder being 2–10% epoxy resin and melt extrusion grade material.

The term "polyamide" refers to high molecular weight polymers having amide linkages along the molecular chain, and refers more specifically to synthetic polyamide such as various Nylons such as Nylon 6, 66, 6/12, 6/66 6/69, poly(meta-xylylene adipamide) (MXD6), including high density versions and nylon copolymers.

Copolymers of certain materials described above, and metal foil or silica layers, can also be employed.

The additional layers may also include one or more layers which are permeable to oxygen. In one preferred embodiment, especially for flexible packaging for food, the layers include, in order starting from the outside of the package to the innermost layer of the package, (i) an oxygen barrier layer, (ii) a layer comprising the scavenging component and optionally, (iii) another oxygen permeable layer. Control of the oxygen barrier property of (i) allows a means to regulate the scavenging life of the package by limiting the rate of oxygen entry from the outside of the package to the scavenging component (ii), and thus limiting the rate of consumption of scavenging capacity. Control of the oxygen permeability of layer (iii) allows a means to limit the rate of oxygen scavenging for the overall structure independent of the composition of the scavenging component (ii). When outer layer (i) is a suitably high barrier and inner layer (iii) is permeable to oxygen, the package as a whole will scavenge oxygen from the inside of the package.

The oxygen scavenger layer (ii) can be placed between two high barrier (i) layers. The life of the film is extended, and also an extremely high oxygen barrier structure is obtained. As a result, a thin, transparent film can be made which is an effective substitute for aluminum foil in some applications. Films made with this symmetrical structure will not scavenge as much oxygen from the interior of the package as the asymmetric films.

Furthermore, layer (iii) can provide a barrier to migration of by-products of oxygen scavenging into the package interior. For this purpose, layer (iii) can be any of several layers interposed between the oxygen scavenging layer and the package interior. For some applications, it may be advantageous to include various layers which add other desirable attributes such as heat sealability, adhesion, abuse resistance, anti-block and anti-fog. It is believed that the oxygen scavenging layer produces small amounts of various organic acids and aldehydes as it absorbs oxygen. Those by-products could potentially produce off-odors and flavors when an oxygen-scavenging thin film is placed in intimate contact with a food. Migration of these by-products can be prevented by the insertion of a layer with an additive that chemically reacts with the by-product.

Possible by-products of oxygen absorption include acetaldehyde, propanal, propionic acid, acetic acid, and possibly other acids and aldehydes. Other moieties may be produced as well. Aldehydes and acids are known to react with organic bases such as amines. Such reactions produce products that are higher in molecular weight and therefore less migratory. In the case where the organic base or amine has a very high molecular weight or is polymeric, the resulting products are essentially immobile. Preferred polymeric amines include polyethylenimine, polymers and copolymers of allylamine (or diallylamine), polymers and copolymers of vinyl amine (which are prepared, for example, by the hydrolysis of N-vinyl formamide polymers and copolymers), polymers and copolymers of vinyl pyridine, and poly(D-glucosamine), more commonly known as chitosan.

It can be difficult to incorporate some polymeric amines into the typical polyolefins used in packaging. Some polymeric amines such as polyethylenimine (PEI) are somewhat thermally unstable at polyolefin processing temperatures, and tend to degrade. Such degradation can produce off odors and flavors, as well as an undesirable yellow color. Furthermore, the migration of the polymeric amine into the package contents is of a concern particularly when the layer containing the polymeric amine is in direct contact with the package contents. These difficulties can be substantially minimized by depositing the polymeric amine on a suitable support such as silica, titania, alumina, zeolites and the like. For example, a solution of PEI in alcohol readily deposits onto the surface of silica. The material is then dried and compounded into a polyolefin as would any filler type material (see Example 1).

Another way to avoid the difficulties with polymeric arnines is to directly functionalize the surface of a support such as silica with amine groups. This can easily be accomplished by treating silica with a reagent such as 3-aminopropyltriethoxysilane in a suitable solvent such as 95% ethanol 5% water. Under these conditions the surface is derivatized in a few minutes. Other suitable reagents are given by the formula $R1R2N(CH_2)_nSi(OR3)_3$, where R1 and R2=H, methyl, or ethyl, n=1–5 and R3=methyl, ethyl or propyl.

Another method of introducing amine groups to silica is via boron-amine groups. This is accomplished by first borating the surface of silica then treating with ammonia at high temperature to give $[Si—O—B—(NH_2)_2]$ on the surface. The preparation of these materials is discussed in *Die Angewandte Makromolekulare Chemie*, 1995, 227, 43–55, Ibid., 1994, 217, 107, and Span. 2026749 (1990), Consejo Superior de Investigaciones Cientificas.

Where sealability is desired, the sealant layer can be a crosslinkable polyolefin or a homopolymer, copolymer, terpolymer or graft copolymer of an alpha olefin such as propylene, ethylene and 1-butene. For example copolymers of ethylene and propylene having an ethylene content of 3–10% by weight (EPC) are heat sealable. Also, ethylene vinylacetate (EVA) having a vinyl acetate/ethylene weight ratio of 5–20%, preferably 8–12%, may be mentioned. Other useful materials are low density (branched) polyethylene ("LDPE") where the density is about 0.915–0.925, linear low density polyethylene ("LLDPE") where the density is in the range of 0.920 to 0.924, and very low density polyethylene ("VLDPE"), having density below 0.910. Acrylate and methacrylate ("(meth)acrylate") polymers such as ethylene (meth)acrylic acid "EMAA", ethylene acrylic acid "EAA" as well as ethylene n-butyl acrylate "EnBA", as well as the salts of (meth)acrylic acid copolymers ("Ionomers"), may also be used. In addition, this layer commonly includes antiblock and antifog additives.

A useful subclass of sealant layers are self-weldable layers. These layers will self-weld under mild heat, and are preferably ethylene vinyl acetate copolymers, and more preferably an EVA with about 10–14% vinyl acetate comonomer and (meth)acrylate polymers.

"Anti-blocking agents", substances that reduce the tendency of films or sheets of polyolefin film to stick or adhere to each other or to other surfaces when such adhesion is otherwise undesirable, may be employed. Typical chemicals such as colloidal silica, finely divided silica, clays, silicons, and certain amides and amines are useful in this application.

Particularly useful are micron-sized silica such as that available under the trade designation EPE-8160 from Teknor Apex and Syloid® from W. R. Grace & Co.-Conn.

Various materials contribute toughness or overall durability to a film structure. These materials often have multiple uses or functions in a film structure. These include ethylene propylene copolymers, various polyethylenes, and ionomers discussed above, with respect to sealant layers. Abuse layers often include antifog and antiblock additives.

In addition to oxygen barrier and oxygen permeable layers, further layers such as adhesive or tie layers may be adjacent to any of the layers listed above. Compositions suitable for adhesive layers include those well known in the art, such as anhydride functional polyolefins.

Adhesive layers may be made of various polymeric adhesives, especially anhydride grafted polymers, copolymers or terpolymers as well as maleic anhydride and rubber modified polymers such as the Plexar® materials available from Quantum Chemical Corp, and the Bynel® series available from DuPont, and the Tymor® series available from, Morton, Inc. These are typically modified polyolefins.

The following examples illustrate the practice of the present invention without limiting its scope or the scope of the claims which follow.

EXAMPLE 1

This example illustrates the ability of certain compositions to absorb aldehydes, such as acetaldehyde and propanal.

A standard test solution was prepared consisting of 1 μL of acetaldehyde and 1 μL of propanal in 1 mL of ethanol. Materials were tested by taking about 20 mg of the substance to be tested and 2 μL of the standard test solution in a 22 mL headspace GC vial. The sealed vial was heated at 60° C. for 2 hours, and a portion of the headspace was auto-injected into the GC (Varian 3400 with a Stabilwax DA capillary column, 30 m by 0.25 mm). A control vial was also run, which contained only the standard test solution. The difference between the control and the test vial was used to calculate the percentage of the aldehyde absorbed.

TABLE 1

| Substance | Weight(mg) | Percent Acetaldehyde Absorbed | Percent Propanal Absorbed |
|---|---|---|---|
| PEI/Silica[a] | 20.7 | 100% | 100% |
| LLDPE with PEI/silica[b] | 21.3 | 100% | 100% |
| Polyethylenimine | 23.0 | 100% | 100% |
| Poly(D-glucosamine) | 21.2 | 52% | 54% |
| Poly(allylamine) | 25.0 | 100% | 100% |
| Poly(4-vinylpyridine) | 32.8 | <1% | 36% |

[a]50% polyethylene imine (PEI) by weight.
[b]2% by weight PEI/silica (total 0.2 mg PEI)

From this example it is readily apparent that polyethylenimine is quite effective in absorbing and/or reacting with various aldehydes, which might be by-products of oxidation. These results also show that PEI loaded onto a silica carrier is very effective in scavenging aldehydes. Furthermore, PEI on silica remains effective when blended into polyethylene at a low level. Furthermore, poly(allylamine) is also effective in scavenging aldehydes, and poly(D-glucosaminme), or chitosan, shows moderate activity.

EXAMPLE 2

A multilayered oxygen scavenging packaging film was prepared with the following structure:
FOOD CONTACT SIDE: |A |B |C |D |E |
Where each letter represents a layer in a multilayer film, and:
A is LLDPE;
B is the oxygen scavenging layer consisting of 85% 1,2-polybutadiene, 15% EPDM rubber, and 10% of a cobalt/benzophenone masterbatch. (Such layers are disclosed in U.S. Pat. No. 5,211,875);
C is EVA;
D is a lamination adhesive;
E is Saran coated PET (oxygen barrier layer).

Oxygen scavenging was initiated in the above packaging film by UV irradiation (UVA dose ~0.96 J/cm$^2$). A layer of polyethylenimine (PEI) was solvent cast from an ethanol/water solution onto the LLDPE side of one portion of the irradiated film. (PEI film was 6 mil thick wet, and the solution was 20% PEI by weight). The PEI case film was allowed to dry for 2 hours. Samples of film (200 cm$^2$) with and without the PEI coating were sealed in barrier bags (made from commercially available Cryovac® BDF 2001 film, available from the Cryovac Division of W. R. Grace & Co.-Conn., Duncan, S.C.) with 600 cc of air and were allowed to scavenge oxygen. Headspace oxygen content of the packages was monitored by withdrawing samples and analyzing using a Mocon® LC 700F oxygen analyzer. After 34 days the PEI coated sample had scavenged oxygen to a capacity of 2,950 cc $O_2$/(m$^2$·mil), (0.5 mil scavenging layer), and the uncoated film had scavenged oxygen to a capacity of 3,500 cc $O_2$/(m$^2$·emil).

Circles of each film were cut (area=283.5 mm2, with PEI, 0.1078 g, without PEI, 0.0972 g) and sealed in vials for static headspace GC analysis. The vials were heated to 80° C. for 1 hour and a portion of the headspace was auto-injected into the GC (Varian 3400 with a Stabilwax DA capillary column, 30 m by 0.25 mm), with the following results:

TABLE 2

| Component Name | Without PEI Area of Peak (μV · sec) | With PEI Area of Peak (μV · sec) | Percent Scavenged |
|---|---|---|---|
| Acetaldehyde | 334,225 | 14,992 | 95.5 |
| Acetic Acid | 276,475 | 9,660 | 96.5 |
| Propionic Acid | 56,974 | 11,710 | 79.5 |

As the above results show, PEI is effective in scavenging aldehydes as well as acids that are produced in the film, and therefore, prevents these compounds from migrating into the package. Because PEI is water soluble, it would be most practical to have this layer separated from the food by one or more food contact layers that are hydrophobic.

EXAMPLE 3

The following samples were tested for their ability to react with aldehydes. A sample of chromatography grade aminopropyl-functionalized silica gel available from Aldrich Chemical Co., Inc., Milwaukee, Wis. (purchased AP-Silica"); a sample of A-P silica was prepared by treating silica (Syloid® 244 available from W. R. Grace & Co.-Conn., Baltimore, Md.) with 3-aminopropyltriethoxysilane. Titration showed a similar number of amine groups in both samples. A pressed film was prepared by compounding linear low density polyethylene ("LLDPE") with 2% by weight purchased A-P silica. A 19 mm disk was cut and tested in headspace vial as described in Example 1. The results are summarized in Table 3.

TABLE 3

| Sample | Weight Absorber (mg) | Percent Acetaldehyde Absorbed | Percent Propanal Absorbed |
|---|---|---|---|
| Purchased AP-Silica | 22.7 | 100% | 100% |
| Silica Control | 21.3 | 0% | 22% |
| AP-silica[a] | 21.8 | 100% | 100% |
| LLDPE with[b] Purchased AP-Silica | 1.88 | 40% | 76% |

[a]This sample was prepared by treating Syloid ® 244 with 3-aminopropyltriethoxysilane. Titration showed a similar number of amine groups as the Aldrich material.
[b]Dowlex 3010 was compounded with 2% by wt. the purchased Aldrich AP-silica, 19 mm disk was tested in headspace vial.

These data show that amino functionalized silica is effective in scavenging these aldehydes. In addition, it is effective at a low loading in a polymer film. It should be noted that Dowlex 3010 contains about as much acetaldehyde and propanal as was added in the test solution, in addition to some other unidentified volatile materials that were also scavenged by incorporation of AP-silica. By itself, typical grades of silica such as Syloid® 244 are not particularly effective in absorbing aldehydes.

EXAMPLE 4

Film structures were made for the purpose of evaluating whether various additives could be used in a polyolefin layer to scavenge certain aldehydes and acids migrating from an oxygen scavenging layer ("OSL"). The screening method involves using LLDPE/OSL/LLDPE structures prepared on a Randcastle Microextruder that contain the aldehyde scavenger in the both LLDPE layers. Films are oxidized to a moderate level (about 1000 cc $O_2/m^2$·mil) and headspace GC analysis is performed on portions of the film. Films containing Syloid® 244 (W. R. Grace & Co.-Conn.) treated with 3-aminopropyltriethoxysilane (from Example 3), about 0.3 mequiv. base per gram silica are compared to a control with no aldehyde scavenger. Table 4 shows the percent in various volatiles relative to the control film.

TABLE 4

Evaluation of Aminopropyl-Functionalized Silica
2% Loading in LLDPE[a] Layers of LLDPE/OSL/LLDPE

| Volatile Component | After 1 day[b] Percent Change from Control | After 5 days[c] Percent Change from Control |
|---|---|---|
| acetaldehyde | −21 | −19 |
| propanal | −19 | −7 |
| acetic acid | −5 | −28 |
| propanoic acid | −9 | −19 |
| Total % volatile components in the chromatogram | −9 | −11 |

[a]LLDPE used is Dowlex 3010 from Dow Chemical.
[b]Oxygen loading of control is 1063 cc $O_2/m^2$ mil, test sample is 911 cc $O_2/m^2$ · mil.
[c]Oxygen loading of control is 1393 cc $O_2/m^2$ · mil, test sample is 1450 cc $O_2/m^2$ · mil.

The amount of certain identified extractables is reduced by the percentages shown in Table 4. In addition, the total amount of all extractables is reduced by the percentages shown. These results show that adding AP-silica to a flanking layer does reduce the levels of aldehydes and acids migrating from the multilayer film. In the GC screening test, AP-silica absorbed acetaldehyde and propanal as well as PEI and poly(allylamine). (See Tables 1–3). This material has an advantage over PEI and other polyamines in that it does not discolor at extrusion temperatures or have any odor of its own. Furthermore, the fine powder is readily incorporated into polyolefins by methods well known to those in the art.

What is claimed is:

1. An article comprising a multilayer structure for an oxygen sensitive product, the structure comprising:
    (a) an oxygen barrier layer;
    (b) an oxygen scavenger; and
    (c) a by-product absorber selected from the group consisting of polymers and copolymers of allylamine, polymers and copolymers of diallylamine, polymers and copolymers of vinyl amine, polymers and copolymers of vinyl pyridine, poly(D-glucosamine), silica-supported polymeric amines, and amine functionalized silicas.

2. The article of claim 1, comprising a multilayer structure having at least one oxygen barrier layer, and at least one oxygen scavenger containing layer, wherein said oxygen scavenger containing layer further comprises said by-product absorber, and wherein said oxygen scavenger containing layer is disposed between an oxygen barrier layer and the oxygen sensitive product.

3. The article of claim 1 wherein the by-product absorber is capable of reacting with aldehyde or acid.

4. An article for packaging an oxygen sensitive product comprising an oxygen barrier and a non-integral packaging component selected from the group consisting of full or partial coatings, bottle or jar cap liners, adhesive or non-adhesive inserts, sealants, gaskets and fibrous mat inserts, wherein the non-integral packaging component comprises an oxygen scavenger and a by-product absorber, wherein the by-product absorber is selected from the group consisting of polymers and copolymers of allylamine, polymers and copolymers of diallylamine, polymers and copolymers of vinyl amine, polymers and copolymers of vinyl pyridine, poly(D-glucosamine), silica-supported polymeric amines, and amine functionalized silicas.

* * * * *